(12) United States Patent
Sikora et al.

(10) Patent No.: US 9,261,417 B2
(45) Date of Patent: Feb. 16, 2016

(54) METHODS AND DEVICES FOR MEASURING THE TEMPERATURE OF A STRAND-LIKE MATERIAL

(71) Applicants: Harald Sikora, Bremen (DE); Abraham Parga Garcia, Bremen (DE)

(72) Inventors: Harald Sikora, Bremen (DE); Abraham Parga Garcia, Bremen (DE)

(73) Assignee: Sikora AG, Bremen (DE)

( * ) Notice: Subject to any disclaimer, the term of this patent is extended or adjusted under 35 U.S.C. 154(b) by 415 days.

(21) Appl. No.: 13/763,876

(22) Filed: Feb. 11, 2013

(65) Prior Publication Data

US 2013/0223476 A1     Aug. 29, 2013

(30) Foreign Application Priority Data

Feb. 28, 2012     (DE) .......................... 10 2012 003 724

(51) Int. Cl.

| G01K 3/00 | (2006.01) |
| G01K 1/14 | (2006.01) |
| G01K 13/00 | (2006.01) |
| G01K 7/00 | (2006.01) |
| G01J 5/00 | (2006.01) |
| G05D 23/19 | (2006.01) |
| B29C 47/00 | (2006.01) |
| B29C 47/02 | (2006.01) |
| B29C 47/88 | (2006.01) |
| B29C 47/92 | (2006.01) |

(52) U.S. Cl.
CPC ............ G01K 13/00 (2013.01); B29C 47/0019 (2013.01); B29C 47/027 (2013.01); B29C 47/8805 (2013.01); G05D 23/19 (2013.01); B29C 47/92 (2013.01); *B29C 2947/92209* (2013.01); *B29C 2947/92447* (2013.01); *B29C 2947/92704* (2013.01); *B29C 2947/92942* (2013.01)

(58) Field of Classification Search
USPC ........... 374/55, 110, 112, 153, 166, 100, 120, 374/121, 141
See application file for complete search history.

(56) References Cited

U.S. PATENT DOCUMENTS

| 3,328,554 A | * | 6/1967 | Biskeborn ..................... 219/636 |
| 3,525,260 A | * | 8/1970 | Kung ............................. 136/214 |
| 3,534,610 A | * | 10/1970 | Pruden ......................... 374/153 |

(Continued)

FOREIGN PATENT DOCUMENTS

| DE | 12 58 625 | 8/1964 |
| JP | 63-120316 | 5/1988 |

(Continued)

OTHER PUBLICATIONS

Zumbach, "AUTAC 250S," catalog, 2 pages.

(Continued)

*Primary Examiner* — Mirellys Jagan
(74) *Attorney, Agent, or Firm* — Bookoff McAndrews, PLLC

(57) ABSTRACT

The disclosure relates to a method for measuring the temperature of a strand-like material to be heated to a target temperature, including the steps: the strand-like material is guided in heat conducting contact about at least one disk, mounted so as to rotate, that is heated to a predefined temperature, and a difference is measured between the temperature of the strand-like material or a value characterizing the temperature of the strand-like material, before conveyance about the disk and after conveyance about the disk. The disclosure also relates to a corresponding device.

26 Claims, 2 Drawing Sheets

(56) References Cited

U.S. PATENT DOCUMENTS

| | | | |
|---|---|---|---|
| 3,540,281 A * | 11/1970 | Inaba Sanro et al. | 374/153 |
| 3,739,132 A | 6/1973 | Ellinghausen et al. | |
| 4,091,673 A * | 5/1978 | Tamura et al. | 374/120 |
| 5,001,925 A * | 3/1991 | Turek | 73/160 |
| 5,760,374 A * | 6/1998 | Schippers et al. | 219/388 |
| 6,851,260 B2 * | 2/2005 | Mernøe | 60/527 |
| 8,348,499 B2 * | 1/2013 | Jons et al. | 374/4 |
| 2011/0018721 A1 * | 1/2011 | Beynon et al. | 340/584 |

FOREIGN PATENT DOCUMENTS

| | | |
|---|---|---|
| JP | 01-305268 | 12/1989 |
| JP | 04-071118 | 3/1992 |
| JP | 2001-38414 | 2/2001 |

OTHER PUBLICATIONS

Zumbach, "Zumbach WST Wire Preheaters," catalog, Feb. 2000, 20 pages.

* cited by examiner

METHODS AND DEVICES FOR MEASURING THE TEMPERATURE OF A STRAND-LIKE MATERIAL

This application claims priority under 35 U.S.C. §119 to German Patent Application No. DE 10 2012 003 724.4, filed Feb. 28, 2012, the disclosure of which is incorporated herein by reference

TECHNICAL FIELD

Embodiments of this disclosure relate to methods and devices for measuring the temperature of a strand-like material that may be, for example, heated to a target temperature.

BACKGROUND

Strand-like materials can be metal wire for example, that may be used as a conductor of a cable. Typically a plastic insulation is extruded onto such wire in an extrusion device. For a proper application and adhesion of the extrudate on the wire, it is necessary for the wire to have a predetermined temperature. Therefore, the wires are generally heated to a target temperature in a preheating unit before the extrusion process. Such a preheating unit is sold by Sikora AG, for example, under the name PREHEATER 6000. With this unit, the wire is guided about two disks that are mounted so as to rotate, of which at least one is electrically conducting, and thus causes a short circuit in the wire loop guided about the disks. The wire can then be heated to the target temperature by means of a heating apparatus disposed between the disks.

The design of a plastic insulation applied in the scope of an extrusion method depends sensitively on the temperature of the wire. Particularly with foaming material applied in the scope of an extrusion, fluctuations in the temperature of the wire can lead to non-uniform thickness of the plastic insulation. Fluctuations in the plastic insulation especially with data cables can lead to capacitance changes, and with it, to changes of the characteristic wave impedance. This in turn, can lead to undesired reflection loss. Furthermore, deviations from the target temperature can also lead to problems with respect to the adhesion of the plastic material to the wire.

It has already been proposed to measure the temperature of the wire after passing through a preheating apparatus. Known measurement methods are based on the evaluation of the temperature-dependent emission behavior of the wire. Specifically with copper wire, which is frequently to be measured in this context, the emission behavior can vary significantly. This results in inaccuracies with the temperature measurement and thus in problems with a subsequent extrusion process.

SUMMARY

An object of the disclosure is therefore to provide a method and a device of the initially named type, with which the temperature of a strand-like material can be measured in a simple and reliable manner.

An object of the disclosure is achieved by a method for measuring the temperature of a strand-like material to be heated to a target temperature, including the steps: guiding the strand-like material in heat conducting contact about at least one disk, mounted so as to rotate, that is heated to a predefined temperature, measuring a difference between the temperature of the strand-like material or a value characterizing the temperature of the strand-like material, before guiding about the disk and after guiding about the disk.

An object of the disclosure is also achieved by a device for measuring the temperature of a strand-like material to be heated to a target temperature, including: a conveying apparatus for the strand-like material that is designed to convey the strand-like material in heat conducting contact about at least one disk, which is mounted so as to rotate, a disk heating apparatus with which the disk can be heated to a predefined temperature, and a differential measuring apparatus with which a difference between the temperature of the strand-like material or a value characterizing the temperature of the strand-like material, can be measured before conveying about the disk and after conveying about the disk.

The disk can be a metal disk, for example. However, other materials are also conceivable for the disk, for example ceramic. The strand-like material can be a wire, particularly a metal wire, such as a copper wire. The wire can later serve as an electrical conductor. The target temperature can correspondingly be a suitable temperature to allow the later application of a (plastic) insulation onto the conductor, for example, in an extrusion method. The strand-like material, particularly the wire, is conveyed continuously in the course of the methods according to the disclosure, or respectively in the devices according to the disclosure. The strand-like material is guided about the at least one disk, wherein a heat conducting contact exists such that possible temperature differences between the disk and the strand-like material are equalized at least to some extent, particularly substantially completely. The disk is preheated to a predefined temperature. For this purpose, at least one heating element can be integrated in the disk. If such an integrated heating element is operated electrically, the electrical energy for this can be supplied to the rotatable disk for example using slip rings. The supply of the electrical energy can also occur inductively for example. It is also possible to heat the disk to the predefined temperature using at least one external heating apparatus, for example an inductive heating apparatus, or a heat radiator or the like.

According to the disclosure, the difference of the temperature, or of a value characterizing the temperature, is measured between the section of the strand-like material incoming at the disk and the section of the strand-like material outgoing from the disk. The differential measurement can advantageously occur in a noncontact manner, for example on the basis of an evaluation of the temperature-dependent emissivity of the strand-like material. If there are temperature differences between the incoming and the outgoing section of the strand-like material, then according to the disclosure such differences are not necessarily to be evaluated absolutely. However, a difference signal can be derived that is proportional to the temperature difference. The difference can be measured continuously. This can occur repeatedly in predefined intervals or also continuously. Correspondingly, the differential measuring apparatus can be developed for the purpose of continuously measuring the difference. If the measured difference is not equal to zero, a temperature difference exists between the incoming section of the strand-like material and the outgoing section.

By heating a strand-like material, such as an electrical conductor, different properties thereof change, for example the extension thereof and the electrical resistance thereof. Along with, for example, a noncontact measurement of the temperature difference between the incoming and the outgoing section of the strand-like material, it is therefore also possible to measure, for example, a change of an electrical conductance, a change in length and/or diameter, and/or a conductance-dependent attenuation between the incoming and the outgoing strand-like material, for example using inductive ring sensors. Thus, a temperature difference does not have to be measured directly. Rather, a difference between suitable parameters characterizing the temperature of the strand-like material can also be measured before and after conveying the strand-like material about the at least one disk.

Thus, according to the disclosure a differential measurement is performed. For determining the temperature of the continuous strand-like material, it may be only necessary to know the temperature of the heated disk if the temperature of the incoming and outgoing section of the strand-like material agree. A relative measurement of the temperature between such sections of the strand-like material is possible in a much simpler manner than determining the absolute temperature. As initially explained, copper wire in particular has a significant range of fluctuation with respect to the emissivity thereof, typically from 0.02 to 0.2. An absolute temperature measurement based on the evaluation of the emissivity of the strand-like material would therefore be associated with significant inaccuracies. This is avoided according to the disclosure, because with the differential measurement according to the disclosure possible fluctuations, for example, with respect to the emissivity, are compensated.

Thus, the disclosure permits a precise detection of a deviation of the temperature of the strand-like material from the target temperature thereof in a simple and, particularly in the case of metal wires, very reliable manner. However, the disclosure provides further advantages. As mentioned above, strand-like materials are frequently heated to target temperatures in operational preheating devices. Such preheating devices can operate inductively, and generally include a frequency control that can lead to nonuniform heating of the strand-like material. This in turn can lead to problems with a subsequent extrusion process due to the initially described reasons. In particular this can lead to nonuniform adhesion of the extrudate, or to nonuniform foaming of an extrudate. The preheated disk used according to the disclosure leads in an advantageous manner to smoothing possible temperature fluctuations that the strand-like material has been subjected to in a heating apparatus upstream of the heated disk. This in turn improves the subsequent extrusion process. As also explained initially, this is extremely important with data cables, because with data cables fluctuations in the insulation can lead to capacitance changes and thus to changes in the characteristic impedance. This in turn can lead to an intolerable reflection loss and thus to problems with the data transmission. Furthermore, the preheated disk according to the disclosure also reduces an undesired cooling of the strand-like material, which the material inevitably experiences after passing through the preheating apparatus.

The predetermined temperature of the disk can be the target temperature of the strand-like material. When the disk is preheated to the target temperature of the strand-like material, a difference measured according to the disclosure immediately shows that the strand-like material does not have the predetermined target temperature. Alternatively, however, the disk can also be heated to a predetermined temperature which is less than or greater than the target temperature of the strand-like material. The strand-like material then experiences a cooling or heating upon conveyance about the disk. When the predetermined temperature of the disk is higher than the target temperature of the strand-like material, for example, a cooling of the strand-like material which the material has already experienced or will yet experience in the course of the further conveyance to an extrusion device can be compensated.

The strand-like material can be guided one or more times around the disk. Thus, the disk can also be looped around one or more times by the strand-like material. Hereby, longer heat conducting contact, and thus, an improved temperature adjustment can be attained between the strand-like material and the disk.

According to one aspect of the disclosure, it is possible to regulate the temperature of the strand-like material to the target temperature on the basis of the measured difference. Based on a measured difference, a preheating device that performs the heating of the incoming strand-like material to the target temperature, for example, can be controlled such that the temperature of the strand-like material takes on the target value. As long as the disk is preheated to the target temperature of the strand-like material, a possible difference detected in the course of the measurement can be regulated to nearly zero in a particularly simple manner. Ultimately, the preheating device for the strand-like material can be controlled in a simple manner, for example, such that the temperature of the strand-like material coincides with the temperature of the heated disk.

The temperature of the strand-like material can be modified in the course of the control by modifying the temperature of the disk. Alternatively or additionally, the temperature of the strand-like material can also be modified in the course of the control by modifying a heating apparatus upstream from the disk in the direction of movement of the strand-like material. Such a heating apparatus can be an inductive heating apparatus. Particularly with very thin strand-like materials, particularly very thin wires, heating using only the heated disk can be sufficient. Generally, however, a separate heating apparatus may be still necessary, which can then heat the strand-like material alone or together with the heated disk. Heating power of such a separate heating apparatus can lie in a range of approximately 90% of the total heating power supplied to the strand-like material, and the heating power of the heated disk can lie in a range of approximately 10% of this total heating power.

The strand-like material can be guided according to a further aspect of the disclosure, about two disks, mounted so as to rotate, of which a first disk is the heated disk and a second disk is a return pulley, wherein in the movement direction of the strand-like material a heating apparatus is disposed between the heated disk and the return pulley. The heating apparatus can be the aforementioned heating apparatus adapted for regulating the temperature of the strand-like material, for example an inductive heating apparatus. With this design, there is an integration of the device according to the disclosure, or respectively the method according to the disclosure, in preheating apparatuses, for instance the apparatus offered for sale by Sikora AG under the name PREHEATER 6000. The strand-like material can be guided initially about the first disk, subsequently about the second disk (return pulley) and then be guided at least once around the first disk, before the strand-like material leaves the device again. The conveying apparatus of the device according to the disclosure is designed correspondingly for this purpose. Particularly with the use of inductive heating apparatuses, or respectively conductive heating apparatuses operating on the basis of using transformers, it can be provided that at least the heated disk is electrically conducting. In this case, the electrically conducting disk forms a short circuit disk, by means of which the strand-like material, metal wire for example, is short-circuited. Heating of the strand-like material can then occur on this basis, as is the case with the preheating device PREHEATER 6000, from Sikora AG. The electrical voltage exists only within the loop of the strand-like material guided around the disks, whereas the section of the strand-like material incoming into the device and outgoing from the device can be de-energized.

According to a further aspect of the disclosure, the temperature of the disk, or a value characterizing the temperature the disk, can be measured and compared to a predetermined temperature or a value characterizing a target temperature of the disk. If a deviation is detected, the disk temperature can be regulated to a predetermined temperature, such as the predetermined temperature or value characterizing the target temperature of the disk. The temperature of the disk, or a value characterizing the temperature of the disk, can be a measured without contact, for example by an infrared sensor, or a thermal imaging camera. This measurement can again occur continuously, wherein the disk temperature measuring apparatus of the device according to the disclosure may be designed correspondingly. The measurement can be repeated, particularly in predefined intervals, or continuously. Based on this measurement then, a suitable disk heating apparatus can be controlled to hold the disk temperature preferably at the predetermined temperature. The disk temperature regulating apparatus and the strand temperature regulating apparatus of the device according to the disclosure can naturally also be formed by a common control apparatus. Likewise, it is also conceivable that the differential measuring apparatus and the disk temperature measuring apparatus are formed by a common measuring apparatus. However, it is also possible to assign a temperature sensor to the disk alone.

According to a further aspect of the disclosure, it can be provided that the difference between the temperature of the strand-like material or the value characterizing the temperature of the strand-like material is measured before conveyance about the disk and after conveyance about the disk by an infrared measuring apparatus, or at least a thermal imaging camera. Infrared sensors that can be used for this purpose are cost-effective. In one embodiment, at least one infrared sensor, or at least one thermal imaging camera, can be disposed in the direction of movement of the strand-like material before the conveyance about the at least one disk, and at least one infrared sensor or respectively at least one thermal imaging camera can be disposed after the conveyance about the at least one disk. However it is also possible, that only one infrared sensor or only one thermal imaging camera is provided which simultaneously senses, and thus measures, both the incoming as well as the outgoing section of the strand-like material. Thus, the temperature of the incoming and outgoing strand can then be measured simultaneously with one recording. In addition, the temperature of the heated disk, about which the strand is guided, can also be simultaneously detected using such a common infrared sensor, or using such a common thermal imaging camera. In this case, a possibly provided temperature regulation for the heated disk can also occur based on a common temperature sensor.

According to a further aspect of the disclosure, the heated disk can be formed from two disks halves which are thermally insulated from each other. The strand-like material then comes in via the first half disk, and exits again via the second half disk. The thermal insulation prevents an opposing temperature influence between the incoming, cold strand section and the outgoing, heated strand section. This is particularly advantageous if the strand-like material is supplied to a heating apparatus only after the (first) guidance about the heated disk. The disk halves can however be electrically connected together, such that the strand conveyed by the device can be short-circuited, for example for inductive heating. For thermal insulation, a thermally insulating, yet electrically conducting intermediate layer can be disposed between the disks.

As already mentioned, the strand-like material can be a wire, particularly a metal wire such as a copper wire. This wire after conveying about the at least one disk, can be supplied to an extrusion device in which plastic insulation is extruded onto the wire. In this manner, the wire serving as an electrical conductor can be insulated in a known manner for later use as a cable.

The devices according to the disclosure can be designed for performing the methods according to the disclosure. Correspondingly, the methods according to the disclosure can be performed using the devices according to the disclosure.

BRIEF DESCRIPTION OF THE DRAWINGS

Exemplary embodiments of the disclosure are explained in the following in more detail using figures. Schematically in the figures.

Figure 1:
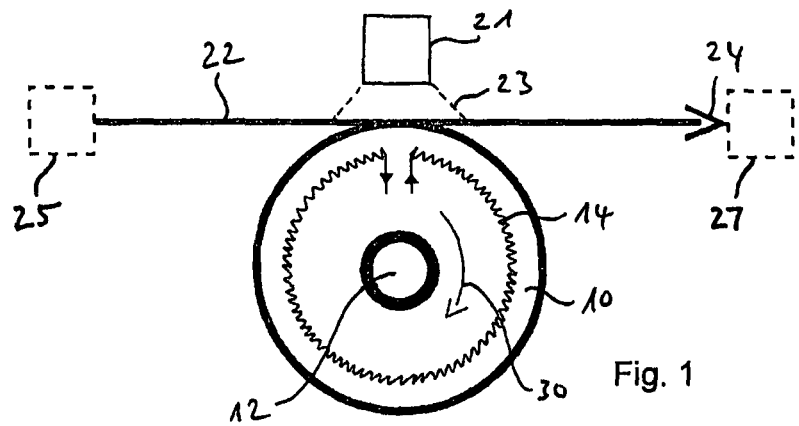
FIG. 1 shows a sectional view of a part of a device according to one aspect of the disclosure.

The same reference numbers refer to the same objects in the figures unless indicated otherwise. In the FIGS. 1 to 3, a disk heated to a predetermined temperature can be seen with the reference number 10. In the example shown, this is a metal disk. The disk 10 is disposed on a shaft 12, and is mounted so as to be rotated by the shaft 12. In the sectional view in FIG. 1, an electrical heating apparatus 14 can be seen that is integrated into the disk 10 for heating the disk 10 to a predetermined temperature. In the represented example slip rings 16, 18 are disposed on the drive shaft 12. Electrical energy is supplied to the electrical heating apparatus 14 by the slip rings 16, 18. The device according to the disclosure further includes a disk temperature regulating apparatus 20, represented only schematically in the FIGS. 2 and 3 for reasons of clarity. The disk temperature regulating apparatus 20 is connected to at least one of the slip rings 16, 18, for supplying electrical current via this slip ring, for example the slip ring 16, for supply of the heating apparatus 14. The other slip ring, for example the slip ring 18, can be grounded such that the electrical current, after passing through the electrical heating apparatus 14, is diverted via this slip ring. The disk temperature regulating apparatus 20 can include a triac regulator.

Furthermore, the device may include a measuring apparatus 21, represented with the exemplary embodiment according to the FIGS. 1 to 3, and shown only in FIG. 1 for reasons of clarity, that measures among others the temperature of the disk 10 in a manner to be described later in more detail, and supplies the measurement result thereof to the disk temperature regulating apparatus 20. If the disk temperature regulating apparatus 20 detects a deviation of the disk temperature measured by the measuring apparatus 21 from the temperature value predetermined therefor, then the disk temperature regulating apparatus 20 controls the electrical current supplied via the appropriate slip ring for supplying the electrical heating apparatus 14 in such a manner that the detected deviation is reduced preferably to zero. The disk temperature can be measured continuously.

Figure 2:
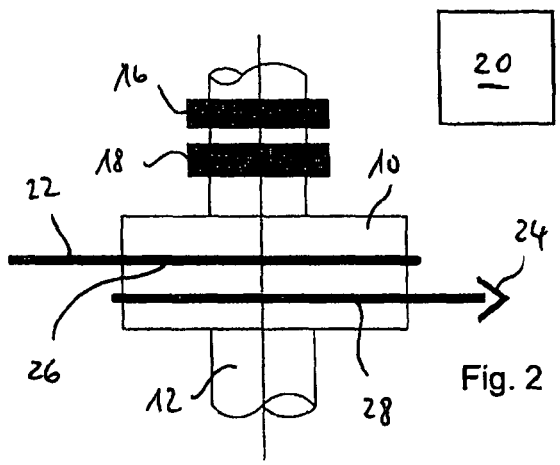
FIG. 2 shows a top view of a part of the device from FIG. 1.
Figure 3:
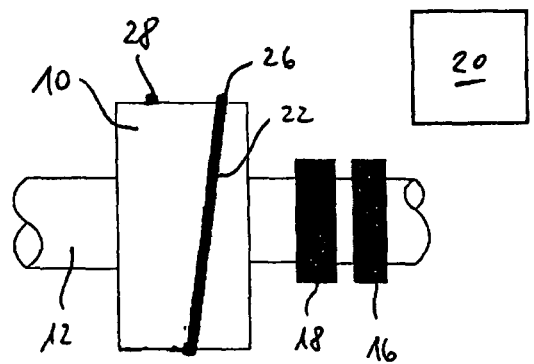
FIG. 3 shows a part of the device from FIG. 1, in a side view with respect to FIG. 2, from the right.

A strand-like material with reference number 22, presently a wire 22, such as a copper wire, can also been seen in the FIGS. 1 to 3. The wire 22 is supplied by a conveying apparatus, not shown in more detail, first to the device, then in the example shown, is guided once completely around the disk 10, and conveyed again away from the device as illustrated by the arrow 24. In particular, it can be seen in the FIGS. 2 and 3 that the wire 22 is thereby continuously divided into a section 26 incoming into the device, or respectively the disk 10 and a section 28 outgoing from the device or respectively the disk 10. The incoming and outgoing section 26, 28 lie next to each other on the disk 10. The wire 22 is conveyed here in heat conducting contact via the disk 10. The disk 10 can be driven rotationally in the direction of rotation indicated in FIG. 1 by the arrow 30 by means of a drive, not shown, or can be rotated using the wire 22 guided about the disk 10.

The measuring apparatus 21 functions in a noncontact manner in the example shown. Particularly, this measuring apparatus can be an infrared sensor or a thermal imaging camera. The infrared sensor, or the thermal imaging camera is, as seen in FIG. 1, directed from above onto the disk 10 with the incoming and outgoing section 26, 28 of the wire 22. From the recorded measurement data, for example recorded infrared emissions, with a known emissivity, the temperature of the disk 10 can be determined. At the same time, a difference can be determined from the recorded measurement image, for example of infrared emission between the incoming section 26 and the outgoing section 28 of the wire 22. This emission difference is characteristic for a temperature difference between the incoming and the outgoing section 26, 28. The measurement range recorded by the measuring apparatus 21 is shown with the reference number 23. This way, the measuring apparatus 21 records the incoming and outgoing section 26, 28 of the wire 22 also before, or respectively after, the respective contact thereof with the disk 10. Through this measure a disruption of the temperature measurement of the wire sections 26, 28 due to signals originating from the disk 10, disruptive reflections for example, is avoided. Thus, the measuring apparatus 21 represents a combined differential measuring apparatus and disk temperature measuring apparatus. Based on the differential measurement, the temperature of the wire 22, can be modified by a wire temperature regulating apparatus, not shown, such that the measured difference lies preferably close to zero, for example. This is the case then, for example, when the disk 10 is heated to the target temperature of the wire 22. The measurement and evaluation of the difference can again occur continuously. Here, the disk temperature regulating apparatus can control a heating apparatus, 25 disposed upstream of the disk 10 in order to modify the temperature of the wire 22 in the desired manner. Additionally or alternatively, it is also conceivable to modify the disk heating apparatus 14 in order to influence the temperature of the wire 22. The wire 22 in the example shown, after passing through the device according to the disclosure is supplied to an extrusion device 27 in which a plastic insulation is extruded onto the wire 22.

Figure 4:
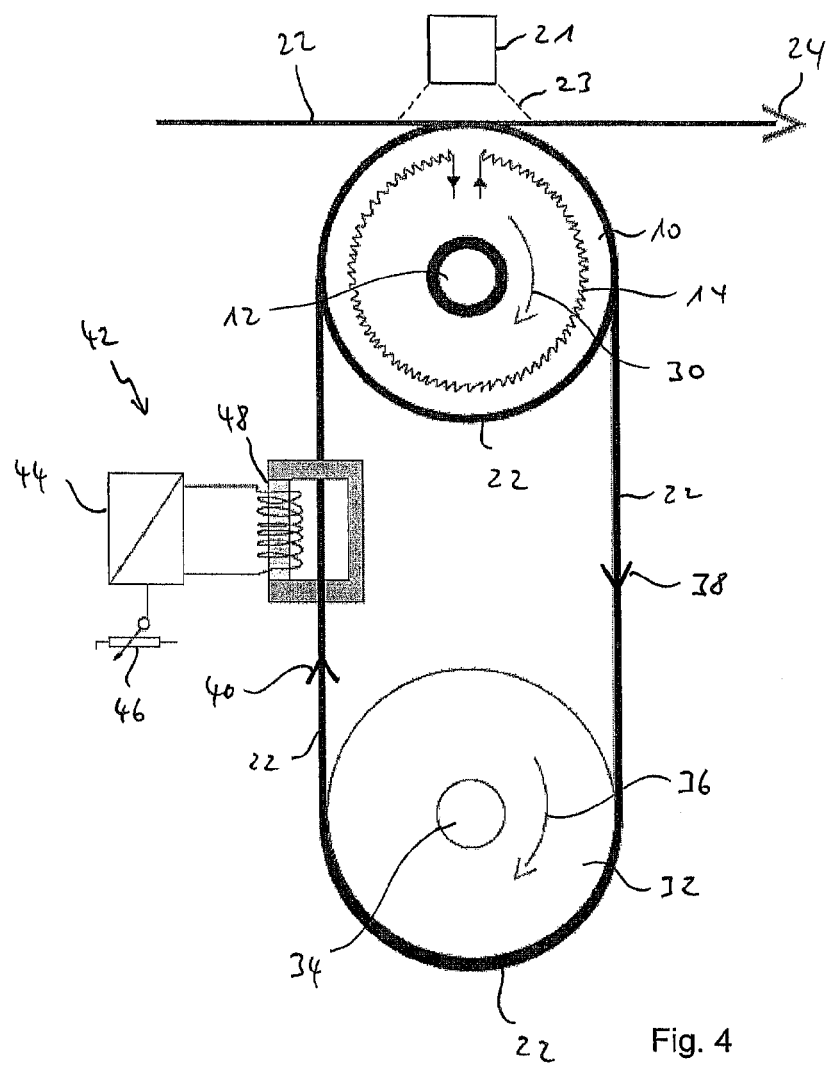
FIG. 4 shows a sectional view of a part of a device according to another aspect of the disclosure.

FIG. 4 shows a second exemplary embodiment of a device according to the disclosure. With this exemplary embodiment, the device represented in the FIGS. 1 to 3 is integrated in a conductor preheating device, such as is sold by Sikora AG under the name PREHEATER 6000 for example. With the exemplary embodiment shown in FIG. 4, the device, along with the disk 10 heated in the above described manner and mounted so as to rotate, also includes a second disk, namely a return pulley 32, which is also mounted on a shaft 34 so as to rotate, as illustrated by the arrow 36. In the exemplary embodiment according to FIG. 4, the wire 22 is guided first about the heated disk 10 to the return pulley 32, as illustrated by the arrow 38. Here, the wire 22 is only guided around the return pulley 32 and then conveyed again to the heated disk 10, as illustrated by the arrow 40 in FIG. 4. Then, the wire 22, in the manner shown in the FIGS. 1 to 3, is guided once completely around the heated disk 10, and then is conveyed out of the device, as illustrated by the arrow 24. Whereas the heated disk 10 is electrically conducting, the return pulley 32 does not need to be electrically conducting. It is sufficient if a short circuit is generated by the heated disk 10, in the wire loop guided around the disks 10, 32. It is then possible to heat the wire 22 in the desired manner by means of a heating apparatus generally indicated with the reference number 42 and disposed in the direction of conveyance of the wire 22 between the return pulley 32 and the heated disk 10. In the example shown the heating apparatus 42 may include a frequency converter 44, a power controller 46, and a transformer 48. The short-circuited wire loop then forms a secondary coil of the transformer 48. Such heating apparatuses 42 are generally known, for example, from the PREHEATER 6000 product from Sikora AG.

With the exemplary embodiment according to FIG. 4, the temperature of the disk 10 is also regulated to a predetermined value in the manner described above for the FIGS. 1 to 3, for example, the target temperature of the wire 22 to be heated. Likewise, in the manner described above, the measuring apparatus 21, along with measuring the temperature of the disk 10, also measures the difference of the temperature, or a value characterizing the temperature, between the incoming wire section 26 and the outgoing wire section 28. Additionally, in the manner described above for the FIGS. 1 to 3, based on this differential measurement, the temperature of the wire 22 is controlled such that the measured difference, for example, preferably takes on the value zero. In the example shown in FIG. 4, the wire temperature can be adapted in a particularly simple manner using the heating apparatus 42 in use already for the conductor preheating. Thus, also with the example shown in FIG. 4, the wire 22, after passing through the device according to the disclosure, is supplied to an extrusion device, not shown in more detail, in which a plastic insulation is extruded onto the wire 22. The heating apparatus 42 serves mainly for preheating the wire 22. In comparison to the heating apparatus 42, low additional heating power can be generated by the heated disk 10.

With the devices according to the disclosure, or respectively the methods according to the disclosure, it is possible to measure and control the wire temperature to a target value in a simple and reliable manner. At the same time, temperature fluctuations generated for example by the heating apparatus 42 are smoothed by the heated disk 10, which has an advantageous effect on the subsequent extrusion.

We claim:

1. A method for measuring the temperature of a strand-like material to be heated to a target temperature, comprising the steps:
   guiding the strand-like material into heat conducting contact with and about at least one disk, wherein the disk is configured to rotate and is heated to a predefined temperature; and
   measuring a difference between the temperature of the strand-like material or a value characterizing the temperature of the strand-like material before conveyance about the disk, and the temperature of the strand-like material or the value characterizing the temperature of the strand-like material after conveyance about the disk.

2. The method according to claim 1, wherein the predefined temperature of the disk is the target temperature of the strand-like material.

3. The method according to claim 1, wherein the strand-like material is guided around the disk one or more times.

4. The method according to claim 1, wherein the strand-like material is guided about two disks, mounted so as to rotate, of which a first is the heated disk, and a second is a return pulley, wherein a heating apparatus is disposed in the movement direction of the strand-like material between the heated disk and the return pulley.

5. The method according to claim 1, further including the steps:
   measuring the temperature of the disk or the value characterizing the temperature of the disk, and comparing the measured temperature of the disk or the value characterizing the temperature of the disk to a temperature predetermined for the disk or a value characterizing the temperature predetermined for the disk; and
   regulating the disk temperature to the predetermined temperature on the basis of a deviation detected in the course of the comparison.

6. The method according to claim 1, wherein at least the heated disk is electrically conducting.

7. The method according to claim 1, wherein measuring the difference includes measuring the temperature of the strand-like material or the value characterizing the temperature of the strand-like material before conveyance about the disk and after conveyance about the disk, with an infrared measuring apparatus or at least one thermal imaging camera.

8. The method according to claim 1, wherein the heated disk is formed from two disk halves which are thermally insulated from each other.

9. The method according to claim 1, wherein the strand-like material is a wire.

10. The method according to claim 9, wherein the wire, after conveying about the at least one disk, is supplied to an extrusion device in which a plastic insulation is extruded onto the wire.

11. The method according to claim 1, wherein the temperature of the strand-like material is regulated to the target temperature based on the determined difference.

12. The method according to claim 11, wherein the temperature of the strand-like material is regulated to the target temperature by modifying the temperature of the disk.

13. The method according to claim 11, wherein the temperature of the strand-like material is regulated to the target temperature by modifying a heating apparatus upstream of the disk in the movement direction of the strand-like material.

14. A device for measuring the temperature of a strand-like material to be heated to a target temperature, comprising:
   a conveying apparatus for the strand-like material that is configured to convey the strand-like material in heat conducting contact about at least one disk, the at least one disk being configured to rotate;
   a disk heating apparatus configured to selectively heat the disk to a predefined temperature; and
   a differential measuring apparatus configured to measure a difference between the temperature of the strand-like material or a value characterizing the temperature of the strand-like material before conveyance about the disk, and the temperature of the strand-like material or the value characterizing the temperature of the strand-like material after conveyance about the disk.

15. The device according to claim 14, wherein the predefined temperature of the disk is the target temperature of the strand-like material.

16. The device according to claim 14, wherein the conveying apparatus is configured to guide the strand-like material one or more times around the disk.

17. The device according to claim 14, wherein the conveying apparatus is configured to convey the strand-like material about two disks, mounted so as to rotate, of which a first is the heated disk and a second is a return pulley, wherein a heating apparatus is disposed between the heated disk and the return pulley in the movement direction of the strand-like material.

18. The device according to claim 14, further including:
   a disk temperature measuring apparatus, with which the temperature of the disk, or a value characterizing the temperature of the disk, can be measured and can be compared to the predefined temperature for the disk or a value characterizing the predefined temperature for the disk; and
   a disk temperature regulating apparatus configured to regulate the disk temperature to the predefined temperature, based on a deviation detected in the course of the comparison.

19. The device according to claim 14, wherein at least the heated disk is electrically conducting.

20. The device according to claim 14, wherein the differential measuring apparatus comprises at least one infrared measuring apparatus or at least one thermal imaging camera.

21. The device according to claim 14, wherein the heated disk comprises two disk halves which are thermally insulated from each other.

22. The device according to claim 14, wherein the strand-like material is a wire.

23. The device according to claim 22, further including an extrusion device for extruding a plastic insulation onto the wire, wherein the conveying apparatus is configured to supply the wire to the extrusion device after the conveying about the at least one disk.

24. The device according to claim 14, further including a strand temperature regulating apparatus configured to regulate the temperature of the strand-like material to the target temperature, based on the measured difference.

25. The device according to claim 24, wherein the strand temperature regulating apparatus is configured to regulate the temperature of the strand-like material to the target temperature by modifying the temperature of the disk.

26. The device according to claim 24, wherein a heating apparatus is disposed upstream of the disk in the movement direction of the strand-like material, wherein the strand temperature regulating apparatus is configured to regulate the temperature of the strand-like material to the target temperature by modifying the heating apparatus.

* * * * *